United States Patent [19]

Besse

[11] Patent Number: 5,689,597
[45] Date of Patent: Nov. 18, 1997

[54] MULTIMODE INTERFERENCE COUPLERS AND METHOD THEREFOR

[75] Inventor: Pierre-André Besse, Renens, Switzerland

[73] Assignee: U.S. Philips Corporation, New York, N.Y.

[21] Appl. No.: 464,731

[22] PCT Filed: Oct. 18, 1994

[86] PCT No.: PCT/CH94/00207

§ 371 Date: Aug. 4, 1995

§ 102(e) Date: Aug. 4, 1995

[87] PCT Pub. No.: WO95/12828

PCT Pub. Date: May 11, 1995

[30] Foreign Application Priority Data

Nov. 4, 1993 [CH] Switzerland ............... 3310/93

[51] Int. Cl.⁶ ........................................ G02B 6/26
[52] U.S. Cl. ........................ 385/39; 385/43; 385/47
[58] Field of Search ........................ 385/15, 27, 28, 385/39, 42–47, 50; 372/92–94, 108

[56] References Cited

U.S. PATENT DOCUMENTS

| | | | |
|---|---|---|---|
| 4,200,356 | 4/1980 | Hawkes et al. | 385/46 X |
| 4,737,002 | 4/1988 | Boucouvalas | 385/42 |
| 5,379,354 | 1/1995 | Jenkins | 385/46 |
| 5,396,570 | 3/1995 | Jenkins et al. | 385/28 |
| 5,428,698 | 6/1995 | Jenkins et al. | 385/27 |
| 5,469,460 | 11/1995 | Van Roijen et al. | 372/94 |

OTHER PUBLICATIONS

Besse et al, "New 1x2 Multi–Mode Interference Couplers With Free Selection Of Power Splitting Ratios", Proceedings of 20th European Conf. On Optical Commun. (ECOC '94), vol. 2, pp. 669–672, Sep. 1994.

*Primary Examiner*—John D. Lee
*Attorney, Agent, or Firm*—Daniel E. Tierney

[57] ABSTRACT

The invention relates to the field of integrated optics and communication techniques. In these fields, integrated, compact passive beam splitters and combiners are of great importance. These optical functions can be fulfilled by means of multimode interference (MMI) couplers. A given number of inputs is evenly distributed to all outputs. These components have wide manufacturing tolerances and are substantially independent of polarization. In the conventional MMI couplers with parallel sides, the intensity and phase distribution at the output are fixed. However, since in many applications, these distributions must be influenced in a controlled manner, the invention provides a method of changing the intensity and phase distributions at the outputs of MMI couplers in a controlled manner. The conventional MMI couplers are first split up into sections. Each section is then separately transformed so that the self-imaging properties are maintained. At the end, the sections are arranged in series again. By appropriate choice of the transformations, different controlled beam splitters and combiners can be obtained. The distributions are changed by means of a simple, tolerant control of geometrical parameters.

33 Claims, 5 Drawing Sheets

MULTIMODE INTERFERENCE COUPLERS AND METHOD THEREFOR

BACKGROUND OF THE INVENTION

In optics (i.e. in conventional optics, three-dimensional optics, planar optics and waveguide optics), light beams are processed. Important functions are the splitting and combining of light beams. In conventional optics, prisms or pellicle splitters are used for this purpose. Nowadays it is being attempted to reduce the dimensions of the optical components to a considerable extent. On the one hand, it is being attempted in three dimensions to realise the processing of light beams by means of interference phenomena (holography) (free space optics). On the other hand, the technique of integrated optics is developing very rapidly. In this technique, thin-film layers or two-dimensional waveguides are used. It is an object of integrated optics to realise the functionality of the components used in conventional optics by new, integrable optical elements. This research field has found important applications in the field of communication.

In fiber-optical communication, data are transmitted by means of optical signals through glass fibers. The optical signals are processed on integrated optical chips which are placed between the fibers. To manufacture these chips, generally thin-film layers are provided on a support (substrates such as, for example glass, Si, InP, GaAs) and subsequently structured.

In optical waveguides the light is guided through a medium (referred to as the waveguide core). The guidance is realised in that the waveguide core is bounded by a reflecting transition. In cavity waveguides, a metal is used for this purpose. In dielectric waveguides, the total reflection on a surrounding medium having a smaller refractive index (the waveguide cladding) is used. In optical waveguides, only those modes can propagate which fulfil the Maxwell equations. The waveguides are referred to as cut-off, monomode or multimode waveguides, dependent on whether they can guide no mode, only one mode for each polarization or a plurality of modes.

In waveguides, the light propagates in the longitudinal direction (z direction). The x direction is parallel to the waveguide layer and is defined as the horizontal, or lateral direction. Analogously, the y direction is vertical to the waveguide layer and is defined as the vertical, or transversal direction. The propagation of light on the chips is computed by means of numerical methods such as beam propagation (BPM) methods, or mode analysis (MA) methods. In some cases, analytical computations such as the effective index method (EIM) are used. The Maxwell equations are often solved in a scalar approximation. These equations describe the planar optics exactly. Two polarizations can be distinguished: the TE polarization has the E vector in the x direction and the TM polarization has the H vector in the x direction. For the most frequently used two-dimensional dielectric waveguides in integrated optics, the scalar approximation leads to "quasi-TE" and "quasi-TM" modes. In such waveguides, the mode forms and the "effective" indexes may be dependent on the polarization. In many cases it is very much desirable, but very difficult, to produce components which are independent of polarization. It should be noted that "monomode" waveguides often have a mode for each polarization, i.e. overall, there are often two modes in "monomode" waveguides. These are degenerate modes in normal glass fibers.

Important components in integrated optics are the beam splitters and combiners. Generally, one refers to $\bar{N} \times N$ splitters. $\bar{N}$ and $N$ denote the number of inputs and outputs. Ideally, these splitters should have the following properties: they should be compact (having small dimensions), independent of polarization, not very sensitive to manufacturing inaccuracies and easy to produce. Moreover, it should be possible to readily adapt the splitting or combining ratios to the various applications by geometrical changes in the design. Various beam splitters and combiners have already been realised:

Symmetrical Y branches are simple solutions for 1×2 splitters with a 50%/50% intensity ratio. Asymmetrical Y branches yield other intensity ratios but, due to coupling effects, they are often polarization-dependent between the two outputs. For manufacturing Y branches, a high resolution, particularly in the sharp bifurcation, is required. They are very sensitive to manufacturing inaccuracies.

Directional couplers with two parallel waveguides separated by means of a narrow slit operate as 2×2 splitters. The coupling length is, however, very sensitive to manufacturing parameters, particularly as regards slit width and depth. The coupling length is also very much dependent on polarization. "Two-mode" interference (TMI) couplers without a slit also operate as 2×2 splitters. The intensity ratio is, however, very much dependent on the coupling into the input and output Y branches. Consequently, they are very sensitive to manufacturing conditions.

Integrated total reflection mirrors are a very compact solution for 1×2 splitters. However, they impose extreme requirements on the manufacturing technique. Moreover, the splitting ratio is very difficult to control and very much dependent on the accuracy of the geometrical dimensions.

In "free space" star couplers, the $\bar{N}$ inputs are evenly distributed among the N outputs by diffraction in a non-guided section. Such elements are suitable for large values of $\bar{N}$ and N. However, they are hardly suitable for 1×2, 2×2 or 1×3 splitters because it is then more and more difficult to realise the homogeneity of the intensity distribution.

In the last few years, multimode interference (MMI) couplers have become more and more popular. These components are waveguide sections guiding a plurality of modes. They are produced, for example by widening a conventional waveguide structure until it guides a sufficient number of modes. The lateral guidance is then, for example, also often increased. Thanks to their self-imaging property, these couplers operate as $\bar{N} \times N$ splitters in two or three dimensions. "Conventional" MMI couplers as used throughout the specification and the following claims are understood to be those elements having parallel sides. It is to be noted that MMI couplers can also be made with slanting sides. Since the invention deals exactly with this point, it is necessary to elucidate the properties of the "conventional" MMI couplers.

The general form of an MMI coupler with parallel sides is shown in FIG. 1a. The conventional or precursor "complete interference N×N-MMI couplers" are characterized by a component length L which is given by:

$$L = \left(\frac{M}{N}\right) \cdot \left(\frac{3}{A}\right) \cdot L_C \equiv \left(\frac{M}{N}\right) \cdot \left(\frac{3}{A}\right) \cdot \frac{\pi}{(\beta_0 - \beta_1)} \equiv \quad (1)$$

-continued $$\left(\frac{M}{N}\right) \cdot \left(\frac{3}{A}\right) \cdot \left(\frac{4}{3} n \frac{W^2}{\lambda}\right)$$

A=1 for this coupler type. $\beta_0$ and $\beta_1$ are the propagation constants of the first two modes of the MMI coupler. W is the width of the MMI coupler and n is the index in the MMI section. $\lambda$ is the wavelength in vacuo. N is the number of images, i.e. also the number of inputs and outputs. M is an integer. N and M do not have a common sub-multiple. All images have the same intensity. The parameter b can be freely chosen. Since the rational numbers (M/N) are dense in the real numbers, any length L can be represented in an arbitrarily good approximation as a length at which self-imaging occurs. However, the images may overlap and the overall image pattern at the output is then the coherent sum of all these images.

If the parameter b is 0 or W/N, the self-images will pair-wise overlap coherently. This leads to a reduction of the number of images and to uneven intensity ratios at the different outputs. In this case, a conventional "overlapping interference" MMI coupler is obtained. They may have uneven intensity ratios but they are not controllable. The ratios are fixed for each type of these elements.

Two special cases of conventional "overlapping interference" MMI couplers have been studied in literature. In both cases, the overlapping of the images yields disappearing image pairs (destructive overlapping) and image pairs having the same intensity. An even intensity is obtained for the remaining images. In the conventional "symmetrical interference" 1×N MMI couplers (FIG. 1b), only symmetrical modes are excited. The length is L=(M/N)*(3$L_c$/4), in which $L_c$ is defined in equation 1 (with A=4). Symmetrical modes are to be used at the input. In the conventional "incomplete interference" 2×N MMI couplers, the modes 2, 5, 8 . . . are not excited. This is achieved when the two inputs are placed at W/3 and 2W/3 (FIG. 1c). The length is now L=(M/N)*$L_c$ (with A=3). The input modes are symmetrical and N is even.

The same discussion could also be held for the "slanting side" MMI couplers. These are multimode waveguide sections in which the sides are not parallel but are located on radial lines. In the multimode section the width is linearly reduced or enlarged. The component may be described in radial or cylindrical coordinates (with radius r and angle $\alpha$). In the new coordinates, the light propagates in the radial direction and the sides of the MMI coupler are defined by constant angle coordinates. In the new coordinate system, the MMI coupler with "slanting sides" is described by means of the same equations as the conventional MMI coupler with parallel sides. This may also be obtained by conform imaging. The following should be noted: first, the inputs and outputs of "slanting side" MMI couplers are located on circular arcs (lines with a constant radius) instead of on straight lines. Secondly, the length L now is:

$$L \equiv |R_1 - R_0| = \left(\frac{M}{N}\right) \cdot \left(\frac{3}{A}\right) \cdot \left[\frac{4}{3} n \frac{(R_0 \Delta\alpha) \cdot (R_1 \Delta\alpha)}{\lambda}\right] \quad (2)$$

$R_0$, $R_1$ are the radial coordinates of the input and output circular arcs. The angle $\Delta\alpha$ is the angle between the "slanting sides". The values ($R_0.\Delta\alpha$) and ($R_1.\Delta\alpha$) may be interpreted as "input and output widths". In equation 1, the width W is to be replaced by the geometrical mean value of the "input and output widths". The parameter A has been defined similarly as for parallel sides.

The MMI couplers may also be realised in three dimensions. The description is similar to the one above but now not only one width but a width (in the x direction) and a thickness (in the y direction) should be taken into account. Due to the self-imaging effect, a two-dimensional array of inputs is imaged on a two-dimensional array of outputs. The three-dimensional MMI couplers with slanting sides may be reduced by spherical coordinate transformation to the case of three-dimensional MMI couplers with parallel sides. The inputs and outputs are then located on spherical surfaces.

The MMI couplers have great advantages. They are compact (both in the "conventional" and in the "slanting side" implementation in two or three dimensions), very much independent of polarization (due to the strong lateral mode guidance), more insensitive to manufacturing inaccuracies and easy to produce. They are also particularly suitable as $\overline{N} \times N$ splitters for small values of $\overline{N}$ and N. They have the drawback that both in the "conventional" and in the "slanting side" implementation, the intensity distribution and the phase distribution at the various outputs cannot be changed. The invention deals exactly with this point.

SUMMARY OF THE INVENTION

It is an object of the invention to change the intensity and phase distribution at the outputs of the MMI couplers in two or three dimensions in a controlled manner. By changing geometrical parameters, these ratios are continuously varied. Particularly interesting are the 1×2 continuously variable splitters and the 1×3 splitters with two identical outputs and one continuously variable output. For this purpose, new geometries are developed for the MMI couplers.

The object is solved by means of the methods as claimed in the pending claims. The new geometries for the new MMI couplers in two or three dimensions with variable intensity and phase distributions are generally obtained by the following modifications of the conventional MMI couplers with parallel lateral sides:

the conventional MMI coupler is split into two or more sections in the direction of propagation so that each section itself is an MMI coupler (with possibly overlapping images);

each section is separately transformed in such a way that the characteristic self-imaging effect of this coupler is maintained or remains maintained in a first approximation. Particularly suitable as two or three-dimensional transformations are: width and length changes, slanting of the lateral sides, lateral displacements and slanting of the input and output waveguides, changing the dimensions of the inputs and outputs;

the transformed sections are directly arranged in series without the use of connection waveguides between the sections. As each section has been transformed, the number of images and their relative phases at the input of the next section are changed. Consequently, the interference phenomenon at the end of the total element is changed. Dependent on the used transformations of the individual sections, the intensity distribution at the existing outputs change, new self-images appear and deliberately generated radiations occur;

new output waveguides are introduced so as to guide newly appearing self-images or gather deliberately generated radiations.

To change the phase ratios at the outputs of multimode interference (MMI) couplers in two or three dimensions, the first and third steps may be omitted. The new method of changing phase ratios is performed in the following steps:

the conventional MMI coupler is transformed in such a way that the characteristic self-imaging effect of this coupler is maintained. After the transformation, the input and output positions should be located on curved lines or curved surfaces. These lines or surfaces are denoted as input and output fronts. Particularly suitable as two or three-dimensional transformations are: width and length changes, slanting of the lateral sides, lateral displacements and slanting of the input and output waveguides, changing the dimensions of the inputs and outputs;

the input and output waveguides are positioned on different lines or surfaces than the input and output fronts, for example on straight lines or on planes;

dependent on the choice of transformation, the input and output fronts are displaced and their curvatures are changed simultaneously. The differences between the positions of the inputs and outputs and the location of the input and output fronts generate changes of the phase distributions at the ends of the components. These distributions may therefore be controlled by suitable choice of the transformation.

Of these two general methods, for example, the following special methods are of great interest.

In the first special method, a part of the input light intensity is split off without disturbing the splitter function of the MMI coupler. This method is performed in the following steps:

the conventional MMI coupler is split into two sections (splitting at the location $z=z_0$). By the choice of $z_0$, the percentage part of the branched light is controlled;

the first MMI section is widened on one or on both sides so that a part of the light will not reach the second MMI section and occurs as radiation on one or on both sides. These deliberately generated radiations are gathered by newly introduced waveguides;

the rest of the light propagates in the second MMI section and interferes at the output of this section. The disturbance of the interference image due to widening of the first MMI section is compensated by small corrections of the positions, the widths and the angles of incidence of the input and output waveguides, as well as of the length of the second MMI section.

The second special method follows the first general method and is characterized in that the slanting of the lateral sides (and the associated adaptation of the lengths and the input and output waveguide positions and directions) is employed as a two or three-dimensional transformation. These transformations and the required adaptations can easily be analyzed by means of coordinate transformations (cylindrical or spherical transformations). After the transformations, the input and output fronts of each section are located on circular or spherical surfaces. As these fronts are not in conformity with each other, phase shifts are produced between the MMI sections (this effect will be illustrated with reference to the following, third special method). Consequently, the interference image and the intensity distribution at the output of the entire component change.

The third special method is a variant of the second special method and is characterized in that the conventional MMI coupler is split only in the middle (FIG. 2). Up to the middle, the width is linearly reduced (enlarged) and from the middle it is linearly enlarged (reduced) again up to the original value. The length of each section is adapted in accordance with equation 2. The transformed components are then referred to as "butterfly" ("inverted butterfly") MMI couplers. The self-imaging properties of the MMI couplers are best maintained if: a) the lateral index guidance is large enough so as to remain multimode along the entire propagation and b) the angle $\Delta\alpha$ between the lateral sides remains small so that a paraxial approximation is still valid. For small $\Delta\alpha$, the values $(R_0.\Delta\alpha)$ and $(R_1.\Delta\alpha)$ in equation 2 can be very well approximated with the lateral dimensions $W_0$ and $(W_0+dW_1+dW_2)$, in which $dW_1$ and $dW_2$ are negative (positive) for butterfly (inverted butterfly) MMI couplers. The inputs are self-imaged by the first MMI section on the output front (circular arc $A_0$). The input front in the second MMI section is, however, the circular arc $E_1$. The region between the two circular arcs $A_0$ and $E_1$ (shaded in FIG. 2) causes phase differences which are dependent on the lateral position of the self-images. These phase differences may be continuously varied by the choice of $dW_1$ and $dW_2$ and control the intensity and phase distributions at the output of the component (interference process). In accordance with the second general method, the inputs and outputs may also be positioned, for example on straight lines instead of on the circular arcs $E_0$ and $A_1$. Only the phase distribution, but not the intensity distribution is then changed.

The methods described above can be supplemented by specific methods so as to produce 1×1, 1×2 and 1×3 splitters. By continuous variations of geometrical parameters, the intensity ratios can then be controlled in these splitters. Such specific methods are elucidated with reference to FIGS. 3 to 5. FIG. 3 illustrates a specific method of producing a 1×1 or 1×2 splitter. A controllable part of the light intensity is gathered by means of a collector waveguide, while the rest of the light is distributed in an output (FIG. 3a) or evenly in two outputs (FIG. 3b). The collector waveguide may be connected to, for example a photodiode which is used as a control monitor. This photodiode may also be provided, for example, directly in the shaded region (FIGS. 3a,b) and operate as an absorbing region. FIGS. 4a,b show specific methods of realizing 1×2 splitters with continuously controllable output intensity ratios. FIG. 5a illustrates a specific method of realising 1×3 splitters with two outputs having the same intensity. The ratio between the third output and the two outputs having the same intensity is continuously controllable. FIGS. 5b,c show specific methods of realizing 1×3 dividers. The intensity ratios between the three outputs are variable.

The invention has the following advantages. All advantages of the conventional MMI couplers are maintained in the new MMI couplers but in addition, changes of the intensity and phase distributions are possible by using the new method. Likewise as for the conventional MMI couplers, the new components are compact, very much independent of polarization (due to the strong lateral mode guidance), more insensitive to manufacturing inaccuracies and easy to produce. By simple geometrical variations of the design parameters, the intensity and phase distributions at the different outputs are changed in the new methods. The new methods allow adaptation of these distributions to the different conditions for use. For example, a small selectable part of the light intensity can be given on a control monitor (FIG. 3a,b) without disturbing the splitter function of the MMI coupler. As a further example, also 1×2 and 1×3 splitters with controllable uneven output intensifies can be produced and this in a simple, compact, polarization-independent and manufacturing-tolerant manner. As compared with the "free space" star couplers, the new MMI couplers are very good as the $\overline{N}\times\overline{N}$ splitters for small $\overline{N}$ and N values. They have no problem with either the sharp bifurcation between the outputs, as in "free space" star couplers or in Y branches.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENT

Figure 1A:
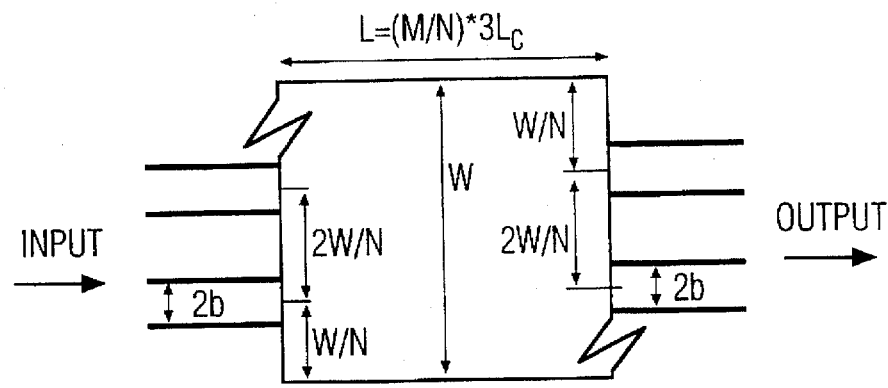
FIG. 1a) shows the general form of an MMI coupler with parallel sides. The conventional "complete interference N×N MMI couplers" are characterized by a component length L which is given by $L=(M/N)*3L_c$. Here, $L_c$ is given by equation 1 (A=1).

FIG. 1a shows the general form of an MMI coupler with parallel sides. The conventional "complete interference N×N MMI couplers" are characterized by a component length L given by: $L=(M/N)*3L_c$. In this case $L_c$ is given by equation 1 (A=1). $\beta_0$ and $\beta_1$ are the propagation constants of the first two modes of the MMI coupler. W is the width of the MMI coupler and n is the index in the MMI section. $\lambda$ is the wavelength in vacuo. N is the number of images, i.e. also the number of inputs and outputs. M is an integer. N and M do not have a common sub-multiple. All images have the same intensity. The parameter b can be freely chosen. Since the rational numbers (M/N) are dense in the real numbers, any length L can be represented in an arbitrarily good approximation as a length at which self-imaging occurs. However, the images may overlap and the overall image pattern at the output is then the coherent sum of all these images.

If the parameter b is 0 or W/N, the self-images will pair-wise overlap coherently. This leads to a reduction of the number of images and to uneven intensity distributions at the different outputs. In this case, a conventional "overlapping interference" MMI coupler is obtained. They may have uneven intensity ratios but they are not controllable. The ratios are fixed for each type of these elements.

Figure 1B:
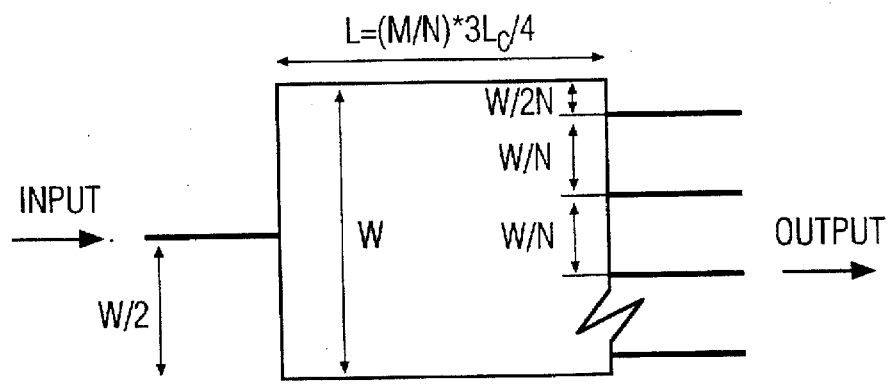
FIG. 1b) shows the conventional "symmetrical interference" 1×N MMI coupler excited by symmetrical modes only. The length is $L=(M/N)*(3L_c/4)$ with A=4.
Figure 1C:
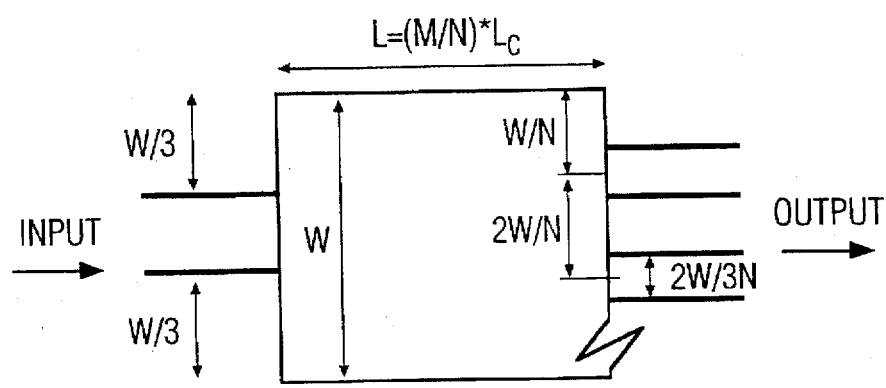
FIG. 1c) shows the conventional "incomplete interference" 2×N MMI couplers in which the modes 2, 5, 8 ... are not excited. The length is now $L=(M/N)*L_c$ with A=3. The input modes are symmetrical and N is even.

Two special cases of conventional "overlapping interference" MMI couplers have been studied in literature. In both cases, the overlapping of the images yields disappearing image pairs (destructive overlapping) and image pairs having the same intensity. An even intensity is obtained for the remaining images. In the conventional "symmetrical interference" 1×N MMI couplers (FIG. 1b), only symmetrical modes are excited. The length is $L=(M/N)*(3L_c/4)$, in which $L_c$ is defined in equation 1 (with A=4). Symmetrical modes are to be used at the input. In the conventional "incomplete interference" 2×N MMI couplers, the modes 2, 5, 8 ... are not excited. This is achieved when the two inputs are placed at W/3 and 2W/3 (FIG. 1c). The length is now $L=(M/N)*L_c$ (with A=3). The input modes are symmetrical and N is even.

FIG. 2 shows special methods which are characterized in that the slanting of the lateral sides (and the associated adaptation of the lengths and the input and output waveguide positions and directions) is employed as a two or three-dimensional transformation. These transformations and the required adaptations can easily be analyzed by means of coordinate transformations (cylindrical or spherical transformations). After the transformations, the input and output fronts of each section are located on circular or spherical surfaces. As these fronts are not in conformity with each other, phase shifts are produced between the MMI sections. Consequently, the interference image and the intensity distribution at the output of the entire component change. FIG. 2 shows a variant of this method in which the conventional MMI coupler is split only in the middle.

Figure 2A:
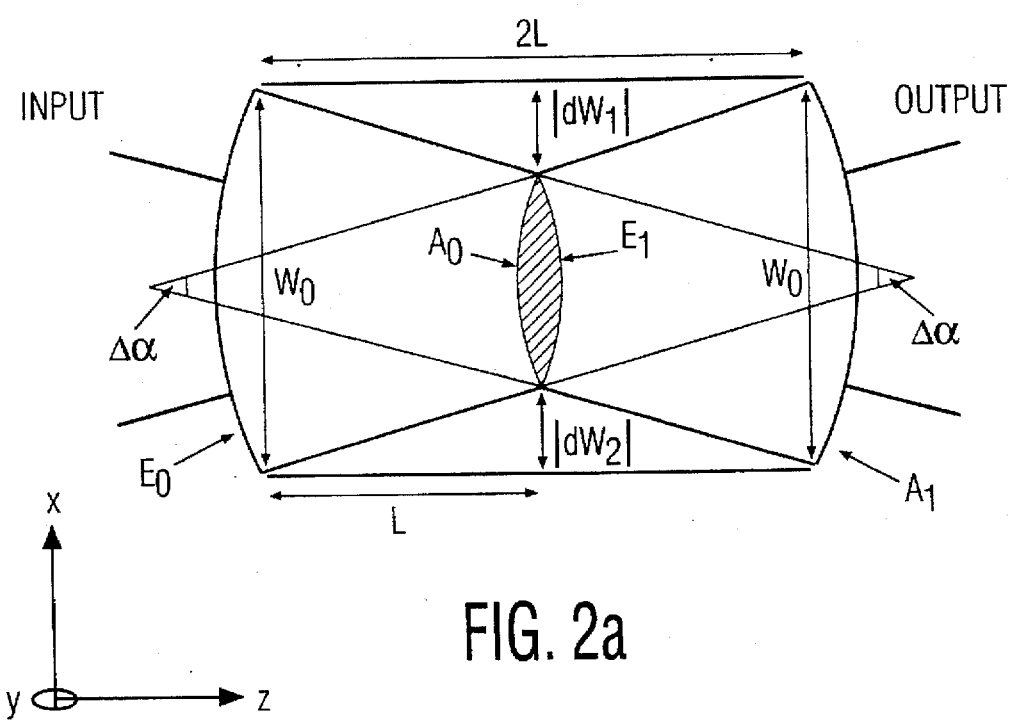
FIG. 2a) shows a butterfly MMI coupler. Up to the middle, the width is linearly reduced and from the middle it is linearly enlarged again up to the original value. The length of each section is adapted in accordance with equation 2.

FIG. 2a) shows a butterfly MMI coupler. Up to the middle, the width is linearly reduced and from the middle it is linearly enlarged again up to the original value. The length of each section is adapted in accordance with equation 2.

Figure 2B:
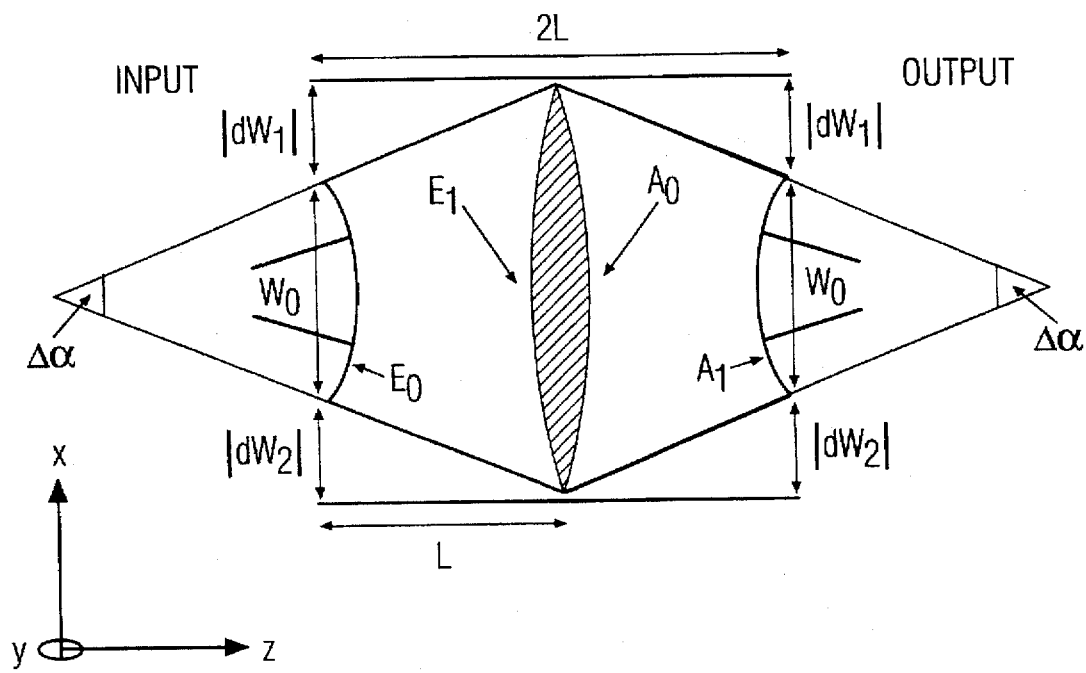
FIG. 2b) shows an inverted butterfly MMI coupler. Up to the middle, the width is linearly enlarged and from the middle it is linearly reduced again up to the original value. The length of each section is adapted in accordance with equation 2.

FIG. 2b) shows an inverted-butterfly MMI coupler. Up to the middle, the width is linearly enlarged and from the middle it is linearly reduced again up to the original value. The length of each section is adapted in accordance with equation 2.

The self-imaging properties of the MMI couplers are best maintained if: 1) the lateral index guidance is large enough so as to remain multimode along the entire propagation and 2) the angle $\Delta\alpha$ between the lateral sides remains small so that a paraxial approximation is still valid. For small $\Delta\alpha$, the values $(R_0 . \Delta\alpha)$ and $(R_1 . \Delta\alpha)$ in equation 2 can be very well approximated with the lateral dimensions $W_0$ and $(W_0+dW_1+dW_2)$, in which $dW_1$ and $dW_2$ are negative (positive) for butterfly (inverted butterfly) MMI couplers.

The inputs are self-imaged by the first MMI section on the output front (circular arc $A_0$). The input front in the second MMI section is, however, the circular arc $E_1$. The region between the two circular arcs $A_0$ and $E_1$ (shaded in FIG. 2) causes phase differences which are dependent on the lateral position of the self-images. These phase differences may be continuously varied by the choice of $dW_1$ and $dW_2$ and control the intensity and phase distributions at the output of the component (interference process). In accordance with the second general method, the inputs and outputs may also be positioned, for example on straight lines instead of on the circular arcs $E_0$ and $A_1$. Only the phase distribution is then changed, not the intensity distribution.

FIG. 3 shows a specific method of producing an 1×1 or an 1×2 splitter introducing a collector waveguide. The collector waveguide may be connected to, for example a photodiode which serves as a control monitor.

Figure 3A:
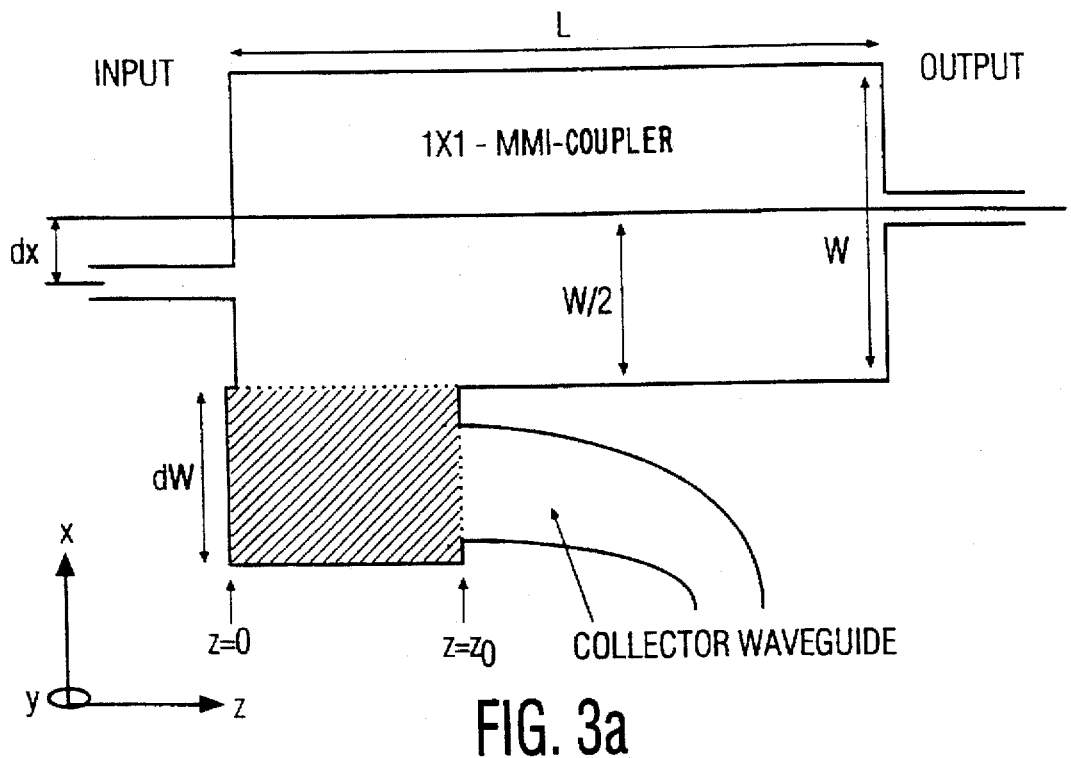
FIGS. 3a) and 3b) show specific methods of producing a 1×1 or a 1×2 splitter, introducing a collector waveguide, in which FIG. 3a) shows a 1×1 splitter with collector waveguide and FIG. 3b) shows a 1×2 splitter with collector waveguide.

FIG. 3a) shows a 1×1 splitter with collector waveguide. A conventional "symmetrical interference" 1×1 MMI coupler (with N=1, M=1, A=4 and L in equation 1) is split into two sections at the location $z=z_0$. The first section is widened on one side by the value dW. On this side the light radiations are gathered with a collector waveguide. By means of a slight displacement dx of the input waveguide, the original self-imaging characteristic can be restored again, i.e. a single image appears at the output. By the choice of $z_0$, the intensity in the collector waveguide can be selected. The method is particularly suitable for small values of $z_0$. The exact values of $z_0$, dW and dx may be computed by means of Simulation programs (such as for example BPM or MA).

As a variant, a light-absorbing material may be introduced into the widened region of the first MMI section (shielded region). No reflection should occur at the input of the absorbing material. The radiations are directly absorbed without being gathered by a waveguide.

Figure 3B:
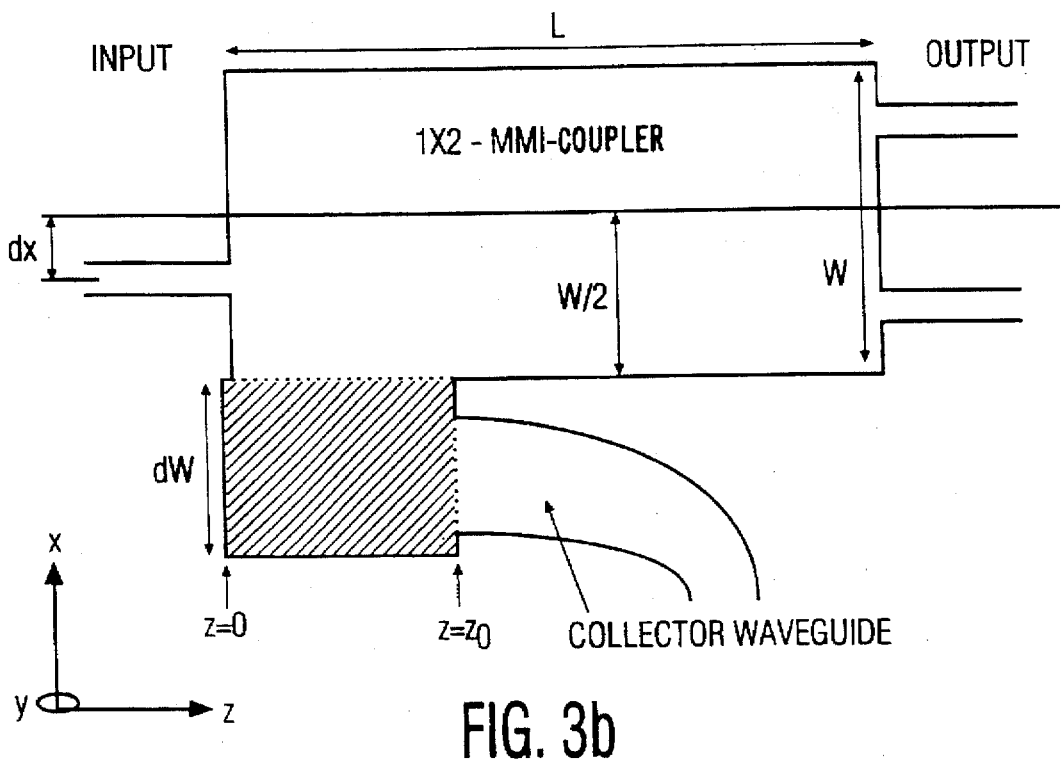

FIG. 3b) shows a 1×2 splitter with collector waveguide. A conventional "symmetrical interference" 1×2 MMI coupler (with N=2, M=1, A=4 and L in equation 1) is split into two sections at the location $z=z_0$. The first section is widened on one side by the value dW. On this side the light radiations are gathered with a collector waveguide. By means of a slight displacement dx of the input waveguide, the original self-imaging characteristic can be restored again, i.e. two images appear with the same intensity at the two outputs. By the choice of $z_0$, the intensity in the collector waveguide can be selected. The method is particularly suitable for small values of $z_0$. The exact values of $z_0$, dW and dx can be calculated by means of simulation programs (such as, for example BPM or MA).

As a variant, a light-absorbing material may be introduced into the widened region of the first MMI section (shaded region). No reflection should occur at the input of the absorbing material. The radiations are directly absorbed without being gathered by a waveguide.

FIG. 4 shows butterfly and inverted butterfly MMI couplers as 1×2 splitters with controlled output intensity distribution. The output intensities may be chosen by simple variations of geometrical parameters (the broken lines apply to inverted butterfly MMI couplers).

Figure 4A:
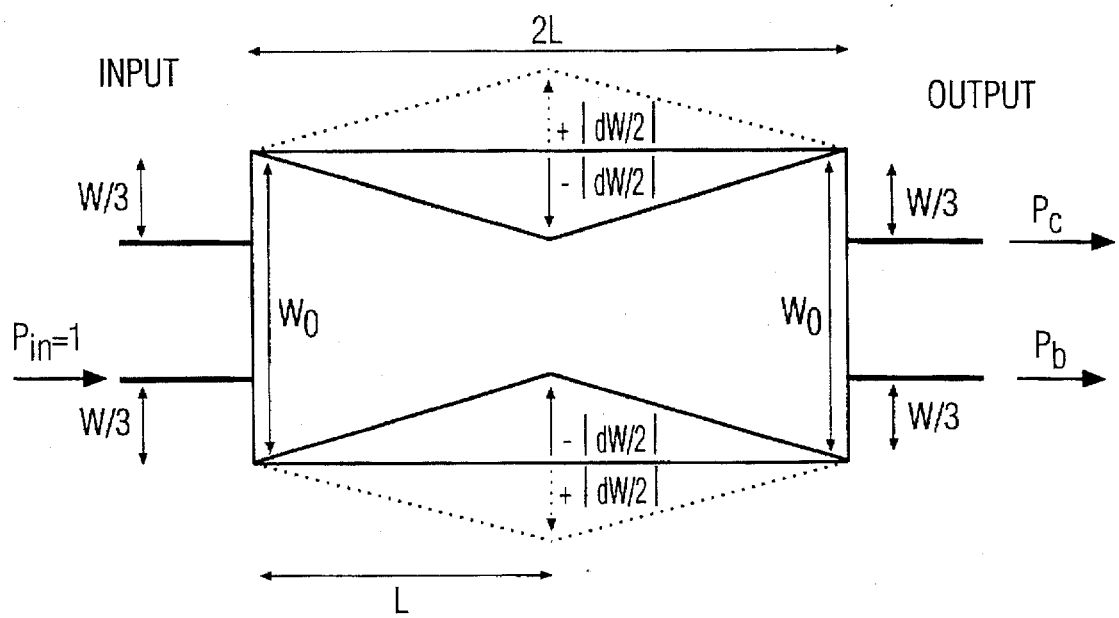
FIGS. 4a) and 4b) show butterfly and inverted butterfly MMI couplers as 1×2 splitters with controlled output intensity ratios, in which FIG. 4a) shows an "(inverted) butterfly 3 dB" MMI coupler as 1×2 splitter (The intensity ratio between the two outputs is controlled by means of the reduction factor or the enlargement factor of the width dW (equation 3), and FIG. 4b) shows an "(inverted) butterfly cross" MMI coupler as 1×2 splitter. (The intensity ratio between the two outputs is controlled by means of the reduction factor or the enlargement factor of the width dW (equation 4)).

FIG. 4a) shows an "(inverted) butterfly 3 dB" MMI coupler as 1×2 splitter. A conventional "incomplete interference 3 dB MMI coupler" (2×2 MMI coupler of FIG. 1c with M=1, N=2 and length as in equation 1 with A=3) is split in the middle and transformed to butterfly or inverted butterfly MMI couplers (as in FIGS. 2a,b). The reduction (butterfly) or the enlargement (inverted butterfly) of the width is effected symmetrically (equally on both sides) i.e. $dW_1=dW_2=dW/2$ (FIGS. 2a,b). The length is adapted. For half the MMI section, the length L in equation 2 is given by M=1, N=4, A=3. For small $\Delta\alpha$ the values $(R_0.\Delta\alpha)$ and $(R_1.\Delta\alpha)$ in equation 2 can be very well approximated with the lateral dimensions $W_0$ and $(W_0+dW)$, in which dW is negative (positive) for butterfly (inverted butterfly) MMI couplers. If the input intensity $P_{in}$ is standardized at one, then the "cross" intensity $P_c$ is given by $$P_C = \frac{1}{2} \cdot \left(1 - \sin\left(\frac{\pi}{2} \cdot \frac{dW}{W_0}\right)\right) \quad (3)$$

Ideally, the "bar" intensity $P_b$ is given by $P_b=1-P_c$.

Figure 4B:
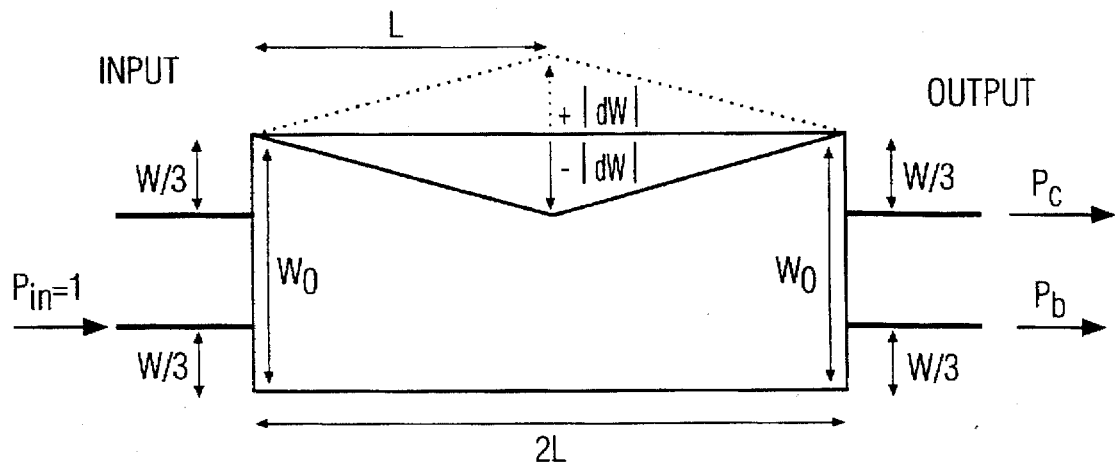

FIG. 4b) shows an "(inverted) butterfly cross" MMI coupler as 1×2 splitter. A conventional "incomplete interference cross MMI coupler" (2×1 MMI coupler of FIG. 1c with M=1, N=1 and length as in equation 1 with A=3) is split in the middle and transformed to a butterfly or inverted butterfly MMI coupler (as in FIGS. 2a,b). The reduction (butterfly) or the enlargement (inverted butterfly) of the width is only effected on one side, i.e. $dW_1=dW$ and $dW_2=0$ (FIG. 2a,b). The length is adapted. For half the MMI section, the length L in equation 2 is given by M=1, N=2, A=3. For small $\Delta\alpha$, the values $(R_0.\Delta\alpha)$ and $(R_1.\Delta\alpha)$ in equation 2 can be very well approximated with the lateral dimensions $W_0$ and $(W_0+dW)$, in which dW is negative (positive) for butterfly (inverted butterfly) MMI couplers. If the input intensity $P_{in}$ is normalized to one, then the "cross" intensity $P_c$ is given by $$P_C = \cos^2\left(\frac{\pi}{2} \cdot \frac{dW}{W_0}\right) \quad (4)$$

Ideally, the "bar" intensity $P_b$ is given by $P_b=1-P_c$.

The components (FIGS. 4a,b) then operate as 1×2 beam splitters, in which the intensity ratio between the two outputs is controlled by the reduction factor or the enlargement factor of the width dW.

It should be noted that the inputs and outputs are positioned on straight lines instead of on circular arcs (as in FIG. 2). In accordance with the second general method, only the phase distribution is changed at the output, and the intensity distribution is not changed.

FIG. 5 shows butterfly and inverted butterfly MMI couplers as 1×3 splitters with controlled output intensity ratios. The output intensifies may be chosen by simple variations of geometrical parameters (the broken lines apply to inverted butterfly MMI couplers).

Figure 5A:
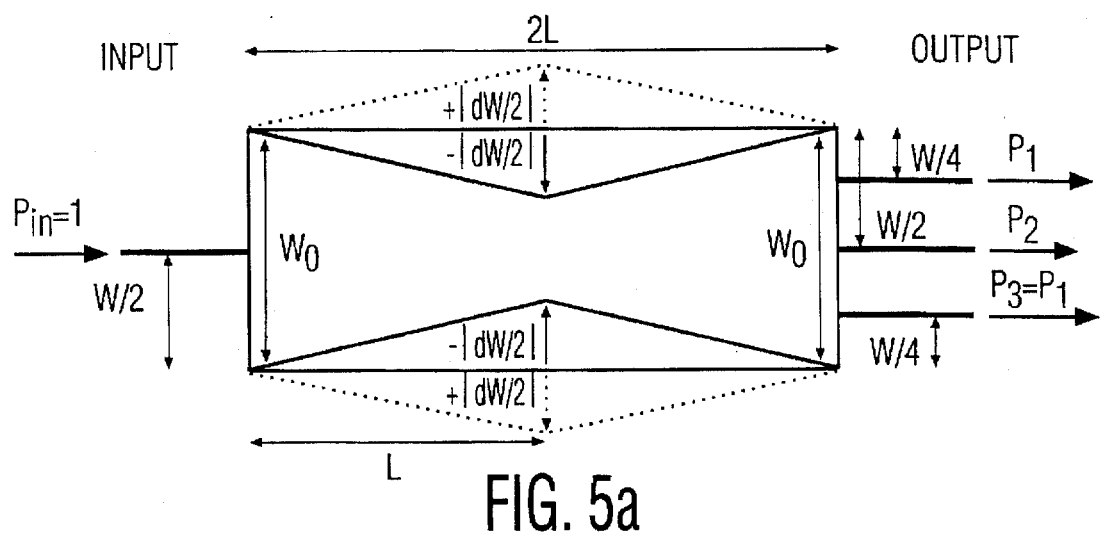
FIGS. 5a) and 5b) show butterfly and inverted butterfly MMI couplers as 1×3 splitters with controlled output intensity distribution, in which FIG. 5a) shows an "(inverted) butterfly symmetrical interference 1×2" MMI coupler as 1×3 splitter. (The intensity ratio between the outer outputs and the inner output are controlled by means of the reduction factor or the enlargement factor of the width dW (equation 5)), and FIG. 5b) shows an (inverted) butterfly MMI coupler as 1×3 splitter: first version. (The intensity ratios are influenced by the reduction factor or the enlargement factor of the width dW. For the width $dW=0.38*W_0$, $P_1 \cong P_2 \cong 0.44*P_{in}$ and $P_3 \cong 0.12*P_{in}$.), and FIG. 5c) shows an (inverted) butterfly MMI coupler as 1×3 splitter: second version. (The intensity distributions are influenced by the reduction factor or the enlargement factor of the width dW. For the value $dW=-0.22*W_0$, $P_1 \cong P_2 \cong 0.44*P_{in}$ and $P_3 \cong 0.12*P_{in}$.).

FIG. 5a) shows an "(inverted) butterfly symmetrical interference 1×2" MMI coupler as 1×3 splitter. A conventional "symmetrical interference 1×2 MMI coupler" (FIG. 1b with M=1, N=2 and length as in equation 1 with A=4) is split in the middle and transformed to butterfly or inverted butterfly MMI couplers (as in FIGS. 2a,b). The reduction (butterfly) or the enlargement (inverted butterfly) of the width is effected symmetrically (equally on both sides) i.e. $dW_1=dW_2=dW/2$ (FIGS. 2a,b). The length is adapted. For half the MMI section, the length L in equation 2 is given by M=1, N=4, A=4. For small $\Delta\alpha$ the values $(R_0.\Delta\alpha)$ and $(R_1.\Delta\alpha)$ in equation 2 can be very well approximated with the lateral dimensions $W_0$ and $(W_0+dW)$, in which dW is negative (positive) for butterfly (inverted butterfly) MMI couplers. $P_1=P_3$ for reasons of symmetry. If the input intensity $P_{in}$ is normalized to one, then the "cross" intensity $P_c$ is given by $$P_2 = \sin^2\left(\frac{\pi}{2} \cdot \frac{dW}{W_0}\right) \quad (5)$$

Ideally, $P_1$ and $P_3$ are given at $P_1=P_3=(1-P_2)/2$. The intensity ratio between the outer outputs and the inner output is controlled by the reduction factor or the enlargement factor of the width dW.

Figure 5B:
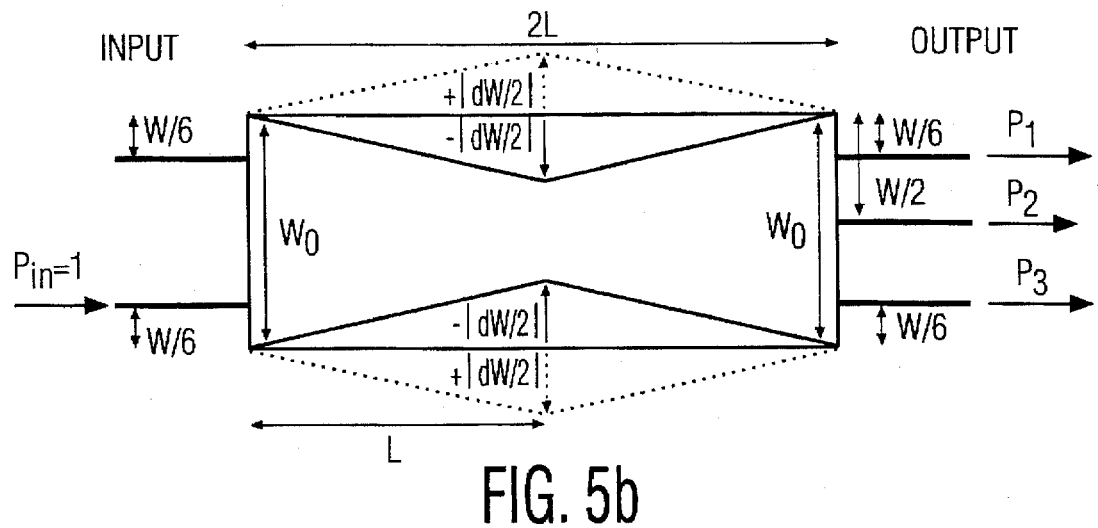

FIG. 5b) shows an (inverted) butterfly MMI coupler as 1×3 splitter: first version. A conventional "incomplete interference 3 dB MMI coupler" (2×2 MMI coupler of FIG. 1c with M=1, N=2 and length as in equation 1 with A=3) is split in the middle and transformed to a butterfly or inverted butterfly MMI coupler (as in FIGS. 2a,b). The reduction (butterfly) or the enlargement (inverted butterfly) of the width is effected symmetrically (equally on both sides), i.e. $dW_1=dW_2=dW/2$ (FIGS. 2a,b). The length is adapted. For half the MMI section the length L of equation 2 is given by M=1, N=4, A=3. For small $\Delta\alpha$ the values ($R_0 \cdot \Delta\alpha$) and ($R_1 \cdot \Delta\alpha$) in equation 2 can be very well approximated with the lateral dimensions $W_0$ and ($W_0+dW$), in which dW is negative (positive) for butterfly (inverted butterfly) MMI couplers. The position of the input waveguides is adapted. The input waveguides are positioned at one sixth of the width (measured from the MMI side). The component operates as a 1×3 beam splitter. The intensity ratios between the outputs are influenced by the reduction factor or the enlargement factor of the width dW. Especially for the value $dW=0.38 \cdot w_0$, $P_1 \cong P_2 \cong 0.44 \cdot P_{in}$ and $P_3 \cong 0.12 \cdot P_{in}$.

Figure 5C:
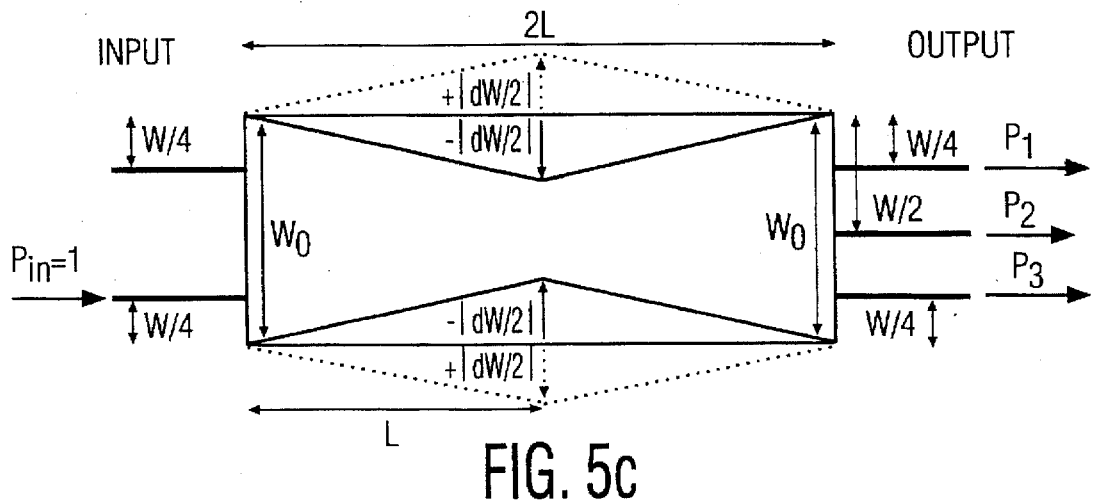

FIG. 5c) shows an (inverted) butterfly MMI coupler as 1×3 splitter: second version. A conventional "symmetrical interference 1×2 MMI coupler" (1×2 MMI coupler of FIG. 1b with M=1, N=2 and length in equation 1 with A=4) is split in the middle and transformed to a butterfly or inverted butterfly MMI coupler (as in FIGS. 2a,b). The reduction (butterfly) or the enlargement (inverted butterfly) of the width is effected symmetrically (equally on both sides), i.e. $dW_1=dW_2=dW/2$ (FIGS. 2a,b). The length is adapted. For half the MMI section the length L as in equation 2 is given by M=1, N=4, A=4. For small $\Delta\alpha$ the values ($R_0 \cdot \Delta\alpha$) and ($R_1 \cdot \Delta\alpha$) in equation 2 can be very well approximated with the lateral dimensions $W_0$ and ($W_0+dW$), in which dW is negative (positive) for butterfly (inverted butterfly) MMI couplers. The position of the input waveguides is adapted. The input waveguides are positioned at one fourth of the width (measured from the MMI side). The component operates as a 1×3 beam splitter. The intensity ratios between the outputs are influenced by the reduction factor or the enlargement factor of the width dW. Especially for the value $dW=-0.22 \cdot w_0$, $P_1 \cong P_2 \cong 0.44 \cdot P_{in}$ and $P_3 \cong 0.12 \cdot P_{in}$.

It should be noted for the components shown in FIGS. 5a,b,c that the input and outputs are positioned on straight lines instead of on circular arcs (as in FIG. 2). In accordance with the second general method, only the phase distribution is changed at the output, and the intensity distribution is not changed.

What is claimed is:

1. A multimode interference (MMI) coupler having an input face and an output face, which coupler comprises at least two sections which are arranged in the direction of propagation and jointly constitute an unsplit multimode waveguide, wherein at least one of said two sections constitutes an MMI coupler having a geometry which differs from that of a conventional MMI coupler, so that a resultant phase distribution which differs from that of the conventional MMI coupler occurs at an end face of said first section, said phase distribution producing a desired interference phenomenon at the output face.

2. The multimode interference (MMI) coupler as claimed in claim 1, wherein at least one of said two sections constitutes an MMI coupler having a geometry which differs from the conventional MMI coupler, so that a number of self-images which differ from those produced by the conventional MMI coupler appear at the end face of said at least one of said two sections.

3. The multimode interference (MMI) coupler as claimed in claim 1, wherein at least one of width and length of at least one of said two sections differs from the corresponding width and length of the conventional MMI coupler so as to achieve at least one of a different phase distribution and a different number of self-images in said at least one of said two sections.

4. The multimode interference (MMI) coupler as claimed in claim 1, wherein at least a lateral side of said one of said two sections is slanted for achieving different phase ratios in said first section.

5. The multimode interference (MMI) coupler as claimed in claim 4, wherein two lateral sides of said one of said two sections are slanted at the same inclination.

6. The multimode interference (MMI) coupler as claimed in claim 4, wherein the width of each of said sections becomes one of linearly smaller and larger in the direction of the other of said sections.

7. The multimode interference (MMI) coupler as claimed in claim 4, wherein the length of at least one of said sections differs from the length of the conventional MMI coupler.

8. The multimode interference (MMI) coupler as claimed in claim 1, wherein at least one of said sections has a slanted lateral side, and a start face or end face of said at least one of said sections is planar.

9. A method of modifying a conventional MMI coupler having parallel lateral sides to produce a modified MMI coupler, the method comprising the steps of:

splitting the conventional MMI coupler into first and second conventional MMI coupler sections in the direction of propagation, said first and second MMI coupler sections each having a start face and an end face, the end face of said second MMI coupler section constituting the output face of the modified MMI coupler; and transforming at least one of said first and said second conventional MMI coupler sections in such a way as to produce a modified MMI coupler section having a phase distribution at its end face which differs from that of the phase distribution at the end face of the corresponding conventional MMI coupler section, which phase distribution changes an interference phenomenon at the output face of the conventional MMI coupler into a desired interference phenomenon at the output face of the modified MMI coupler.

10. The method according to claim 9, wherein the transforming step comprises changing the width of at least one of said first and said second MMI coupler sections.

11. The method according to claim 9, wherein the transforming step comprises changing the length of at least one of said first and said second MMI coupler sections.

12. The method according to claim 9, wherein the transforming step comprises changing the angling of lateral sides of at least one of said first and said second MMI coupler sections.

13. The method according to claim 9, wherein the transforming step comprises laterally displacing a selected one of input and output waveguides connected to said first and second MMI coupler sections, respectively.

14. The method according to claim 9, wherein the transforming step comprises angling a selected one of input and output waveguides connected to said first and said second MMI coupler sections, respectively.

15. The method according to claim 9, wherein the transforming step comprises modifying at least one dimension of a selected one of input and output waveguides connected to said first and said second MMI coupler sections, respectively.

16. A method of changing the intensity and phase distribution at an output face of a precursor multimode interference (MMI) coupler having parallel lateral sides so as to produce a modified MMI coupler, the method comprising the steps of:

splitting the precursor MMI coupler into first and second conventional MMI coupler sections in the direction of propagation, each of said first and second sections having a start face and an end face, the end face of said second MMI coupler section constituting an output face of said modified MMI coupler; and transforming at least one of said first and said second conventional MMI coupler sections in such a way as to produce a modified MMI coupler section having a phase distribution at its end face which differs from that of the phase distribution at the end face of the precursor MMI coupler section, and which phase distribution changes the interference phenomenon at the output face of the precursor MMI coupler into a selected interference phenomenon at the output face of the modified MMI coupler.

17. The method according to claim 16, wherein the precursor MMI coupler is characterized as having a length L in the direction of propagation defined as $$L=(M/N)*(3/A)*L_c$$

wherein $$L_c=\pi/(\beta_0-\beta_1)\approx 4nW^2/3\lambda$$

and wherein

A=1

$\beta_0$ and $\beta_1$ are respective propagation constants of first and second modes of the precursor MMI coupler, W is the width of the precursor MMI coupler, n is the index in the precursor MMI coupler, $\lambda$ is the wavelength in vacuum, N is the number of images, and M is an integer, where N and M do not have a common sub-multiple.

18. The method according to claim 16, wherein the transforming step comprises changing the width of at least one of said first and said second MMI coupler sections.

19. The method according to claim 16, wherein the transforming step comprises changing the length of at least one of said first and said second MMI coupler sections.

20. The method according to claim 16, wherein the transforming step comprises changing the angling of lateral sides of at least one of said first and said second MMI coupler sections.

21. The method according to claim 16, wherein the transforming step comprises laterally displacing a selected one of input and output waveguides connected to said first and second MMI coupler sections, respectively.

22. The method according to claim 16, wherein the transforming step comprises angling a selected one of input and output waveguides connected to said first and said second MMI coupler sections, respectively.

23. The method according to claim 16, wherein the transforming step comprises modifying at least one dimension of a selected one of input and output waveguides connected to said first and said second MMI coupler sections, respectively.

24. An improved multimode interference (MMI) coupler having an input face and an output face, which MMI coupler comprises first and second MMI coupler sections proximate to one another in the direction of propagation, wherein said first and second MMI coupler sections define an unsplit multimode waveguide, the improvement characterized in that at least said first MMI coupler section constitutes a modified MMI coupler having a geometry which differs from that of a precursor MMI coupler, so that a resultant phase distribution which differs from that of the precursor MMI coupler occurs at an end face of said first section, said phase distribution producing a selected interference phenomenon at the output face, wherein the precursor MMI coupler is characterized as having a length L in the direction of propagation defined as $$L=(M/N)*(3/A)*L_c$$

wherein $$L_c=\pi/(\beta_0-\beta_1)\approx 4nW^2/3\lambda$$

and wherein

A is a real number, $\beta_0$ and $\beta_1$ are respective propagation constants of first and second modes of the precursor MMI coupler, W is the width of the precursor MMI coupler, n is the index in the precursor MMI coupler, $\lambda$ is the wavelength in vacuum, N is the number of images, and M is an integer, where N and M do not have a common sub-multiple.

25. The multimode interference (MMI) coupler as claimed in claim 24, wherein at least one of said first and second MMI coupler sections has a geometry which differs from that of the precursor MMI coupler in such a manner that a number of self-images which differ from those produced by the precursor MMI coupler appear at the end face of said at least one of said first and second MMI coupler sections.

26. The multimode interference (MMI) coupler as claimed in claim 24, wherein at least one of width and length of said at least one of said first and second MMI coupler sections differs from the corresponding width and length of the precursor MMI coupler so as to achieve a different phase distribution and a different number of self-images, respectively, in said at least one of said first and second MMI coupler sections.

27. The multimode interference (MMI) coupler as claimed in claim 24, wherein at least a lateral side of said first MMI coupler section is angled to thereby produce different phase ratios in said first MMI coupler section.

28. The multimode interference (MMI) coupler as claimed in claim 27, wherein two lateral sides of said first MMI coupler section are angled at the same inclination.

29. The multimode interference (MMI) coupler as claimed in claim 27, wherein the width of each of said first and second MMI coupler sections becomes one of linearly smaller and larger in the direction of the other of said first and second MMI coupler sections.

30. The multimode interference (MMI) coupler as claimed in claim 27, wherein the length of said at least one of said first and second MMI coupler sections differs from the length of the precursor MMI coupler.

31. The multimode interference (MMI) Coupler as claimed in claim 24, wherein at least one of said first and said second MMI coupler sections has a slanted lateral side, and a selected one of a start face and an end face of said at least one of said first and second MMI coupler sections is planar.

32. The multimode interference (MMI) coupler as claimed in claim 24, wherein the end face of said first MMI coupler section comprises first and second end face portions, the first end face portion being congruent with an input face of said second MMI coupler section, wherein the output face of said MMI coupler comprises the end face of said second MMI coupler section and said second end face portion of said first MMI coupler section, said first MMI coupler section being wider than said second MMI coupler section, and wherein corrections to a selected one of position, width and angle of incidence of an input waveguide coupled to the input face of the modified MMI coupler, position, width and angle of incidence of an output waveguide connected to said second end face portion of said first MMI coupler section, and a correction of the length of the second MMI coupler section produces the desired interference phenomenon at the output face of the modified MMI coupler.

33. The multimode interference (MMI) coupler as claimed in claim 24, wherein an area of said first MMI coupler section comprises a light-absorbing material.

* * * * *